US010565201B2

(12) United States Patent
Beavin et al.

(10) Patent No.: US 10,565,201 B2
(45) Date of Patent: Feb. 18, 2020

(54) QUERY PROCESSING MANAGEMENT IN A DATABASE MANAGEMENT SYSTEM

(71) Applicant: International Business Machines Corporation, Armonk, NY (US)

(72) Inventors: Thomas A. Beavin, Milpitas, CA (US); Zhang Hao, Beijing (CN); Shuo Li, Beijing (CN); Xiaobo Wang, Beijing (CN); Ke Wei Wei, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 411 days.

(21) Appl. No.: 15/344,431

(22) Filed: Nov. 4, 2016

(65) Prior Publication Data
US 2018/0129708 A1 May 10, 2018

(51) Int. Cl.
*G06F 16/20* (2019.01)
*G06F 16/2455* (2019.01)
*G06F 16/2453* (2019.01)

(52) U.S. Cl.
CPC .... *G06F 16/24552* (2019.01); *G06F 16/2453* (2019.01)

(58) Field of Classification Search
None
See application file for complete search history.

(56) References Cited

U.S. PATENT DOCUMENTS

| 7,143,107 | B1* | 11/2006 | Nebres, Jr. | G06F 16/2423 707/603 |
| 7,370,030 | B2 | 5/2008 | Dettinger | |
| 8,943,041 | B2 | 1/2015 | Simon et al. | |
| 9,396,287 | B1* | 7/2016 | Bhave | G06F 11/3476 |
| 2007/0083490 | A1* | 4/2007 | Au | G06F 16/24544 |
| 2007/0203893 | A1* | 8/2007 | Krinsky | G06F 16/33 |
| 2011/0082854 | A1* | 4/2011 | Eidson | G06F 16/24544 707/714 |
| 2013/0232133 | A1* | 9/2013 | Al-Omari | G06F 16/2456 707/714 |
| 2015/0169655 | A1 | 6/2015 | Gupta | |
| 2015/0186465 | A1* | 7/2015 | Gaza | G06F 16/24544 707/714 |
| 2016/0117369 | A1 | 4/2016 | Bent | |
| 2016/0196306 | A1* | 7/2016 | Beavin | G06F 16/24544 707/714 |

\* cited by examiner

*Primary Examiner* — Jau Shya Meng
(74) *Attorney, Agent, or Firm* — Erik K Johnson

(57) ABSTRACT

Disclosed aspects relate to query processing management in a database management system (DBMS). The DBMS may detect that a query has a set of subqueries. The DBMS may detect that the set of subqueries indicates a set of data structures. A lead data structure may be selected from the set of data structures using a selection criterion. A set of input columns may be identified from the lead data structure of the set of data structures. A set of output columns may be identified from the set of data structures other than the lead data structure. A hash data structure may be constructed using the set of input columns and the set of output columns. A cache may be built based on the hash data structure.

18 Claims, 9 Drawing Sheets

700

Table A 710

| | C1 | C2 | C3 | C4 |
|---|---|---|---|---|
| | ABC | A | 1 | 2 |
| | DEF | C | 3 | 4 |
| | ABC | B | 1 | 3 |
| | ABC | D | 2 | 2 |

← 712 (C1), 714 (C3)

Table B 720

| | C1 | C2 | C3 |
|---|---|---|---|
| | ABC | 1 | X |
| | DEF | 2 | Y |

← 716

740
A.C1 = B.C1
AND B.C1 = C.C1
AND A.C3 > 0

Table C 730

| | C1 | C2 | C3 | C4 |
|---|---|---|---|---|
| | ABC | 11 | H1 | aa |
| | ABC | 12 | H2 | bb |
| | ABC | 13 | H3 | cc |
| | DEF | 20 | P1 | ff |
| | DEF | 22 | P2 | gg |

| | 810 | | 820 | |
| | Input columns of JOIN, Hash Key | | Output columns of JOIN, Hash Value | |

| Row # | A.C1 | A.C3 | | | |
|---|---|---|---|---|---|
| 1-1 | ABC | 1 | X | 11 | aa |
| 1-1 | ABC | 1 | X | 12 | bb |
| 1-1 | ABC | 1 | X | 13 | cc |
| 1-2 | DEF | 3 | Y | 20 | ff |
| 1-2 | DEF | 3 | Y | 22 | gg |

Cache hit by row# 1-3

Outer SELECT list 830

| A.C4 + | || 'ABC' | UPPER( ) |
|---|---|---|
| 3 + 11 | 'X' || 'ABC' | UPPER(aa) |
| 3 + 12 | 'X' || 'ABC' | UPPER(bb) |
| 3 + 13 | 'X' || 'ABC' | UPPER(cc) |

FIG. 8

QUERY PROCESSING MANAGEMENT IN A DATABASE MANAGEMENT SYSTEM

BACKGROUND

This disclosure relates generally to database management systems and, more particularly, relates to query processing management in database management systems. Databases are used to store information for numerous types of applications. Examples include various industrial, commercial, technical, scientific, and educational applications. Database management systems (DBMSs) are a typical mechanism for accessing data stored in a database. DBMSs are typically configured to separate the process of storing data from accessing, manipulating, or using data stored in a database. DBMSs often require tremendous resources to handle the heavy workloads placed on such systems. As such, it may be useful to increase the performance of database management systems with respect to processing searches, or queries, to databases.

SUMMARY

Aspects of the disclosure relate to query processing management in a database management system (DBMS). A dynamic join result cache may be used to facilitate query processing management. A set of input columns and a set of output columns may be identified from a set of data structures in the DBMS. A hash data structure may be constructed using the set of input columns and the set of output columns. Based on the hash data structure, a dynamic join result cache may be built. In the event that a set of new inputs match an entry within the join result cache, then a join operation may be skipped, and the value of the corresponding output column in the join result cache may be returned as the result. In the event that a set of new inputs do not match an entry within the join result cache, then SQL (Structured Query Language) operations may proceed, and a new entry may be added to the join result cache.

Aspects of the disclosure relate to query processing management in a database management system (DBMS). The DBMS may detect that a query has a set of subqueries. The DBMS may detect that the set of subqueries indicates a set of data structures. A lead data structure may be selected from the set of data structures using a selection criterion. A set of input columns may be identified from the lead data structure of the set of data structures. A set of output columns may be identified from the set of data structures other than the lead data structure. A hash data structure may be constructed using the set of input columns and the set of output columns. A cache may be built based on the hash data structure.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

FIG. 7 depicts an example set of data structures for query processing management in a database system (DBMS), according to embodiments.

FIG. 8 depicts an example hash data structure for query processing management in a database system (DBMS), according to embodiments.

Figure 1:
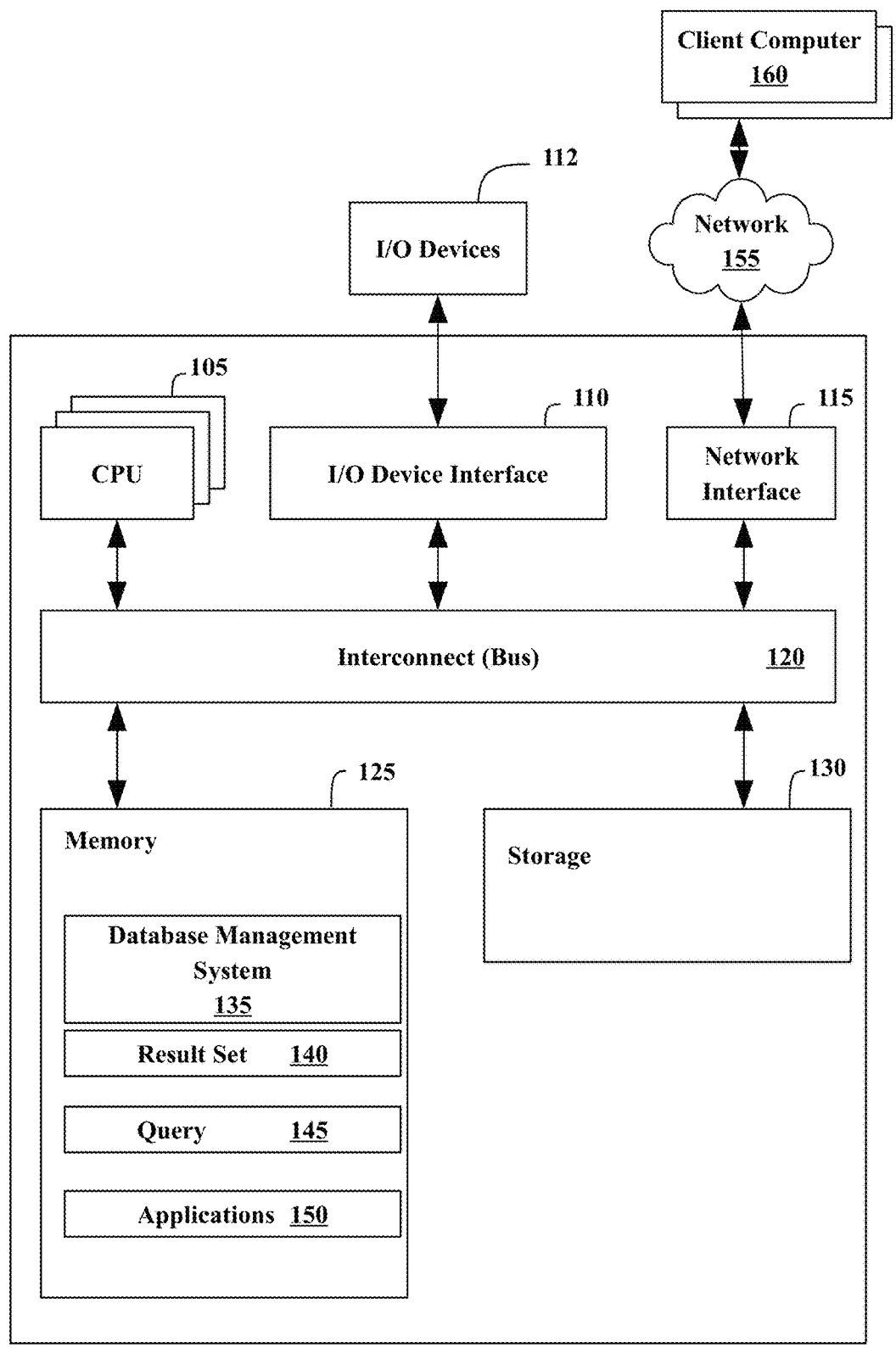
FIG. 1 illustrates an example representation of a computer system connected to a client computer via a network according to an embodiment.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the disclosure relate to query processing management in a database management system (DBMS). A dynamic join result cache may be used to facilitate query processing management. A set of input columns and a set of output columns may be identified from a set of data structures in the DBMS. A hash data structure may be constructed using the set of input columns and the set of output columns. Based on the hash data structure, a dynamic join result cache may be built. In the event that a set of new inputs (e.g., input and output columns of a new query) match an entry within the join result cache, then a join operation may be skipped, and the value of the corresponding output column in the join result cache may be returned as the result. In the event that a set of new inputs do not match an entry within the join result cache, then SQL (Structured Query Language) operations may proceed, and a new entry may be added to the join result cache. Leveraging a dynamic join result cache may be associated with streamlined query management, processing efficiency, and database performance.

Subqueries are one tool used in database queries to instruct a database to perform an operation in multiple steps. Aspects of the disclosure relate to the recognition that in some situations, certain subqueries may be executed multiple times, despite having been processed in the past. As an example, a join operation using particular input columns may have been already been performed, but still be repeated multiple times as part of a subquery. Accordingly, aspects of the disclosure relate to selecting a set of input columns and a set of output columns referenced in a query to construct a join result cache in which the results of database operations are maintained in a hash data structure to facilitate data access and retrieval. For instance, if the input and output columns in a current row of a lead table correspond with the input and output columns of a previous row from the leading table, then the result calculated for the current row may be the same as the result calculated for the previous row. As such, if the result (e.g., in a SELECT statement) of a previous row is cached (e.g., in the join result cache), then there is no need to use the values of the current row to perform the database operation and evaluate the expression in the SELECT statement, as the results from the previous row may be reused as the results for the current row. In this way, use of the join result cache may facilitate database query management efficiency.

Aspects of the disclosure include a method, system, and computer program product for query processing management in a database management system. A query that has a set of subqueries may be detected by the DBMS. The DBMS may detect that the set of subqueries indicates a set of data structures. A lead data structure may be selected from the set of data structures using a selection criterion. The selection criterion may be configured based on a primary key criterion, a unique index criterion, a sequence criterion, or a cost estimation criterion. A set of input columns may be identified from the lead data structure of the set of data structures. The set of input columns of the lead data structure may be identified from a set of predicates of the query. A set of output columns may be identified from the set of data structures other than the lead data structure. The set of output columns of the set of data structures may be identified from a SELECT statement of the query. A hash data structure may be constructed using the set of input columns and the set of output columns. Based on the hash data structure, a cache may be built. The query may be processed by the DBMS using the cache.

In embodiments, a match may be determined by comparing a set of new inputs with the cache. A join operation may be bypassed. Based on the match with respect to the cache, a set of output values may be returned. In embodiments, a mismatch may be determined by comparing a set of new inputs with the cache. A join operation to generate a new entry may be performed, and a new entry may be added to the cache. Altogether, aspects of the disclosure may provide performance or efficiency benefits for query processing management in a database management system (e.g., speed, flexibility, responsiveness, resource usage, productivity). Aspects may save resources such as bandwidth, processing, or memory.

FIG. 1 illustrates an example representation of a computer system 100 connected to one or more client computers 160 via a network 155, according to some embodiments. For the purposes of this disclosure, computer system 100 may represent practically any type of computer, computer system, or other programmable electronic device, including but not limited to, a client computer, a server computer, a portable computer, a handheld computer, an embedded controller, etc. In some embodiments, computer system 100 may be implemented using one or more networked computers, e.g., in a cluster or other distributed computing system.

The computer system 100 may include, without limitation, one or more processors (CPUs) 105, a network interface 115, an interconnect 120, a memory 125, and a storage 130. The computer system 100 may also include an I/O device interface 110 used to connect I/O devices 112, e.g., keyboard, display, and mouse devices, to the computer system 100.

Each processor 105 may retrieve and execute programming instructions stored in the memory 125 or storage 130. Similarly, the processor 105 may store and retrieve application data residing in the memory 125. The interconnect 120 may transmit programming instructions and application data between each processor 105, I/O device interface 110, network interface 115, memory 125, and storage 130. The interconnect 120 may be one or more busses. The processor 105 may be a single central processing unit (CPU), multiple CPUs, or a single CPU having multiple processing cores in various embodiments. In one embodiment, a processor 105 may be a digital signal processor (DSP).

The memory 125 may be representative of a random access memory, e.g., Static Random Access Memory (SRAM), Dynamic Random Access Memory (DRAM), read-only memory, or flash memory. The storage 130 may be representative of a non-volatile memory, such as a hard disk drive, solid state device (SSD), or removable memory cards, optical storage, flash memory devices, network attached storage (NAS), or connections to storage area network (SAN) devices, or other devices that may store non-volatile data. The network interface 115 may be configured to transmit data via the communications network 155.

The memory 125 may include a database management system (DBMS) 135, a result set 140, a query 145, and applications 150. Although these elements are illustrated as residing in the memory 125, any of the elements, or combinations thereof, may reside in the storage 130 or partially in the memory 125 and partially in the storage 130. Each of these elements will be described in greater detail in accordance with FIG. 2.

The network 155 may be any suitable network or combination of networks and may support any appropriate protocol suitable for communication of data and/or code to/from the server computer system 100 and the client computer system 160. In some embodiments, the network 155 may support wireless communications. In other embodiments, the network 155 may support hardwired communications. The network 155 may be the Internet and may support Internet Protocol in some embodiments. In other embodiments, the network 155 may be implemented as a local area network (LAN) or a wide area network (WAN). The network 155 may also be implemented as a cellular data network. Although the network 155 is shown as a single network in the figures, one or more networks of the same or different types may be included.

The client computer system 160 may include some or all of the hardware and software elements of the computer system 100 previously described. As shown, there may be one or more client computers 160 connected to the computer system 100 via the network 155. In some embodiments, one or more client computers 160 may send a query 145 by network 155 to computer system 100 and receive a result set 140.

Figure 2:
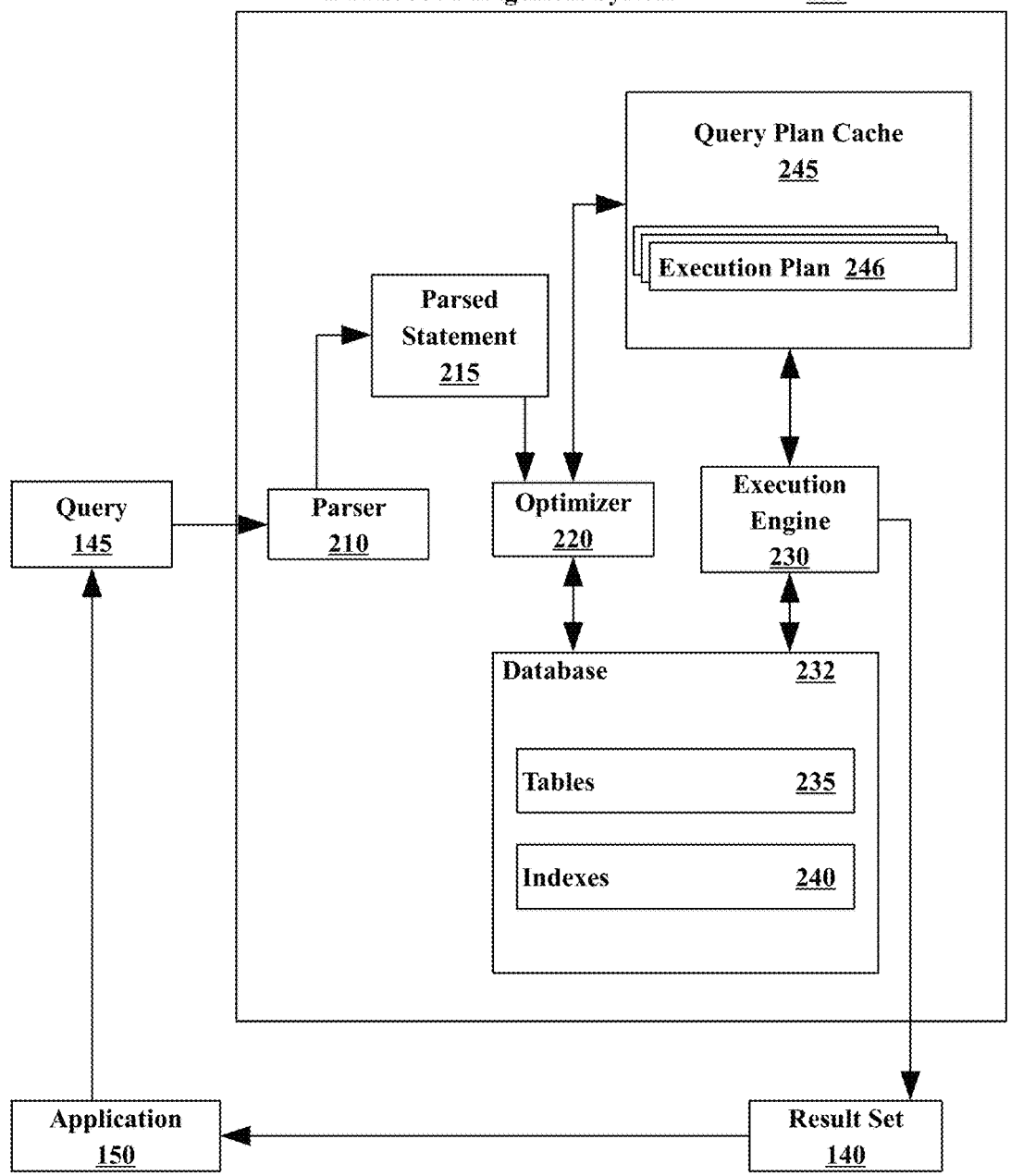
FIG. 2 illustrates an example database management system (DBMS) according to an embodiment.

FIG. 2 illustrates an example database management system (DBMS) 135. The DBMS 135 may include a parser 210, an optimizer 220, an execution engine 230, and a database 232. The parser 210 may receive a database query 145 from an application 150. In some embodiments, the database query 145 may be in the form of a Structured Query Language (SQL) statement. The parser 210 may generate a parsed statement 215. The parser 210 may send the parsed statement 215 to an optimizer 220. The optimizer 220 may attempt to optimize the parsed statement. In some embodiments, optimizing may improve the performance of the database query 145 by, for example, reducing the amount of time it takes to provide a user with a response. The optimizer 220 may generate an execution plan 246 (access plan), which may be maintained in a query plan cache 245, according to some embodiments. The query plan cache 245 may include one or more execution plans 246, including the current execution plan as well as previously used execution plans. Once an execution plan 246 is generated, the execution plan 246 may be sent to the execution engine 230. The execution engine 230 may execute the query 145. Executing the query 145 may include finding and retrieving data in the database tables 235 that satisfies the criteria supplied in the query 145. The execution engine 230 may store the data returned matching the query 145 in a result set 140. The DBMS 135 may return the result set 140 to an application 150, such as the application in which the database query 145 was generated, as a response to the database query 145.

A database 232 may include one or more tables 235 and, in some embodiments, one or more indexes 240. A database table 235 may organize data into rows and columns. Each row of a database table 235 may correspond to an individual entry, a tuple, or a record in the database 232. A column may define what is stored in each entry, tuple, or record. In some embodiments, columns of a table 235 may also be referred to as fields or attributes. Each table 235 within the database 232 may have a unique name. Each column within a table 235 may also have a unique name. A row, tuple, or record, however, within a particular table 235 may not be unique, according to some embodiments. A database 232 may also include one or more indexes 240. An index 240 may be a data structure that may inform the DBMS 135 of the location of a particular record within a table 235 if given a particular indexed column value. In some embodiments, the execution engine 230 may use the one or more indexes 240 to locate data within a table 235. In other embodiments, the execution engine 230 may scan the tables 235 without using an index 240.

As mentioned herein, the optimizer 220 creates the query access plan. The optimizer 220 may be implemented as computer program instructions that optimize the access plan in dependence upon database management statistics. Database statistics may reveal, for example, that there are only two identification values in a transactions table—so that it is an optimization, that is, more efficient, to scan the transactions table rather than using an index. Alternatively, database statistics may reveal that there are many transaction records with only a few transaction records for each identification value—so that it is an optimization, that is, more efficient, to access the transaction records by an index.

Figure 3:
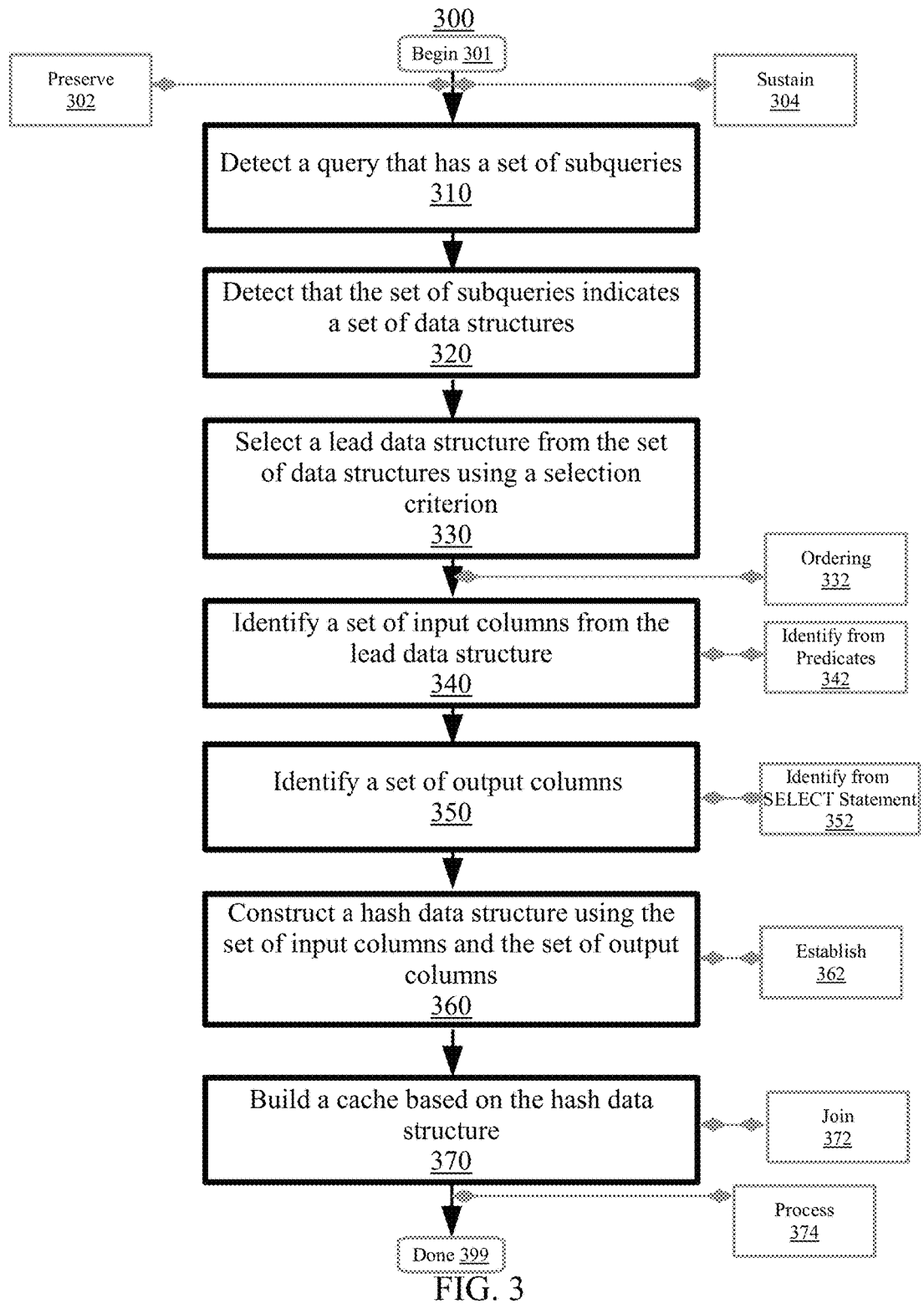
FIG. 3 is a flowchart illustrating a method for query processing management in a database management system (DBMS), according to embodiments.

FIG. 3 is a flowchart illustrating a method 300 for query processing management in a database management system (DBMS), according to embodiments. Aspects of method 300 relate to using a set of input columns and a set of output columns to build a cache to facilitate query processing management of a query. The query may include an inquiry, set of instructions, commands, or request for data or information from a database. The query may include a select query (e.g., data retrieval query), an action query (e.g., request for an operation such as insertion, updating, or deletion to be performed on a set of data), or other type of query. In embodiments, the query may be expressed in a query language such as SQL (Structured Query Language), CLSQL (Common List Structured Query Language), SchemeQL (Scheme Query Language), or the like. The query may include one or more subqueries. As described herein, aspects of method 300 relate to using a cache built based on a hash data structure to process a query. The method 300 may begin at block 301.

In embodiments, the query may be preserved to keep the query unchanged with respect to semantic features of the query at block 302. Aspects of the disclosure relate to the recognition that, in some situations, database queries may be modified into semantically equivalent queries to facilitate query processing. However, in some situations, database queries may be complex, challenging to modify or rewrite, and place constraints on the time and skills of developers. Accordingly, aspects of the disclosure relate to processing database queries without changing the semantic features of the query. Generally, preserving can include maintaining, retaining, regulating, or securing, a database query. In embodiments, preserving the query may include denying requests to modify semantic or syntactic quantities of the query, and processing the query using a cache. As an example, in response to receiving a query to perform an insertion operation in the database, attempts to modify or rewrite the query may be prevented, and the query may be processed by a cache. Other methods of preserving the query to keep the query unchanged with respect to semantic features are also possible.

In embodiments, a set of indexes of a set of data structures may be sustained to maintain the set of indexes without creation of a new index to process the query at block 304. Aspects of the disclosure relate to the recognition that, in some situations, additional indexes may be created within a database table to facilitate query processing. However, in some situations, the creation of additional indexes may cause challenges with respect to particular database operations (e.g., update, insert, delete statements), as indexes may need to be actively maintained and synchronized. Accordingly, aspects of the disclosure relate to processing database queries without changing the number of indexes. Generally, sustaining can include preserving, retaining, securing, or otherwise maintaining a set of indexes with respect to a query. In embodiments, sustaining can include marking a fixed number of indexes with a designation tag (e.g., indicating allowance for use with respect to the query), and preventing the addition or subtraction of indexes to the fixed number of specified indexes. Other methods of sustaining the set of indexes are also possible.

At block 310, a query that has a set of subqueries may be detected. The query may be detected by the DBMS. Generally, detecting can include sensing, discovering, collecting, recognizing, or otherwise receiving the query that has the set of subqueries. The set of subqueries (e.g., inner queries, nested queries) may include one or more queries (e.g., requests) that are embedded within another query. In embodiments, the set of subqueries may be embedded within a clause (e.g., SELECT clause, FROM clause, WHERE clause) of an original query. The set of subqueries may be configured to facilitate performance of an operation in multiple steps. As an example, the set of subqueries may include one or more FROM clauses and WHERE clauses to call data from specified locations to create a filtered list. At block 320, the DBMS may detect that the set of subqueries indicate a set of data structures. The set of data structures may include a set of tables, indexes, diagrams, columns, rows, or other methods of organizing and presenting data. For instance, the set of data structures may include tables of information within a database system. In embodiments, detecting that a query has a set of subqueries that indicate a set of data structures may include utilizing a query parsing tool to analyze the query, ascertain the structure of the query (e.g., syntax, number of subqueries), and identify the specific data structures that are referenced or called by the query. As an example, the FROM clause of a subquery may be parsed, and it may be determined that the FROM clause indicates a set of tables. Other methods of detecting the query that has a set of subqueries or detecting that the set of subqueries indicates a set of data structures are also possible.

At block 330, a lead data structure may be selected from the set of data structures using a selection criterion. Generally, selecting can include choosing, electing, specifying, picking-out, ascertaining, or otherwise designating the lead data structure from the set of data structures. The lead data structure may include a table, index, set of columns, set of rows, or other data structure configured to serve as a reference for one or more database operations. In embodiments, the lead data structure may include a primary table that maintains a set of data to be used as the input to a database operation. In embodiments, the lead data structures may be chosen dynamically based on a set of rules (e.g., criteria) or a cost estimation (e.g., comparison with a cost model). In embodiments, the lead data structure may be selected from the set of data structures using a selection criterion. As examples, the selection criterion may include a primary key criterion (e.g., unique identifier for records in the database), a unique index criterion (e.g., index that enforces the constraint that each combination of values in the index key is unique), a sequence criterion (e.g., user-defined scheme bound object that generates a sequence of numeric values according to a specification), or a cost estimation criterion (e.g., predicted/expected size of a table). In embodiments, selecting may include estimating (e.g., calculating) the size of a cache that would result from use of one or more data structures as the lead data structure, and choosing the data structure with the a cache below a threshold size value (e.g., smallest resulting cache) as the lead data structure. Other methods of selecting the lead data structure are also possible.

In embodiments, a set of records of the lead data structure may be ordered at block 332. The set of records may be ordered to manage cache efficiency. Generally, ordering can include organizing, classifying, categorizing, sorting, or otherwise arranging a set of records of the lead data structure. The set of records may include a collection of data entries maintained in rows or columns of the lead data structure. In embodiments, ordering may include performing a "SORT" (e.g., ORDER BY) operation to arrange data in ascending or descending order based on one or more columns. As an example, a set of records including the names, ages, and number of years a group of individuals have worked for a particular company may be located in the lead data structure. Accordingly, the set of records may be sorted in ascending or descending order alphabetically, by age, or number of years that they have worked for the company. In embodiments, ordering the set of records of the lead data structure may positively impact performance of a cache management operation (e.g., comparisons made between with respect to the cache/lead data structure may be performed for quickly/efficiently). Other methods of ordering the set of records of the lead data structure are also possible.

At block 340, a set of input columns may be identified from the lead data structure of the set of data structures. Generally, identifying can include sensing, recognizing, detecting, ascertaining, or otherwise determining the set of input columns from the lead data structure of the set of data structures. The set of input columns may include a set of data values of a particular type (e.g., organized in a vertical structure) that serve as one component for intake (e.g., ingesting, importing) by a database processing operation (e.g., for use in constructing a hash data structure). In embodiments, the set of input columns may be identified exclusively from the lead data structure (e.g., not partially selected from other data structures). In embodiments, identifying may include ascertaining columns referenced within a particular clause of the query as the set of input columns. For instance, in embodiments, the query may include a set of predicates. A predicate may include an expression that evaluates to a value of TRUE, FALSE, or UNKNOWN. The predicate may include a clause (e.g., WHERE clause) that specifies that a particular SQL statement should only affect rows that meet specified criteria. In embodiments, the set of input columns of the lead data structure may be identified from a set of predicates of the query at block 342. For instance, the set of input columns may be identified as those table columns that are referenced in the predicate of a query (e.g., the set of predicates indicates the set of columns). As an example, the query may be analyzed using a query parsing tool, and the columns that are specifically referenced in the predicate of the query may be identified as the set of input columns. Other methods of identifying the set of input columns are also possible.

At block 350, a set of output columns may be identified from the set of data structures other than the lead data structure. Generally, identifying can include sensing, recognizing, detecting, ascertaining, or otherwise determining the set of output columns from the set of data structures other than the lead data structure. The set of output columns may include a set of data values of a particular type (e.g., organized in a vertical structure) that indicate the results of a database processing operation. The set of output columns may include a collection of data values stored externally (e.g., separately) from the lead data structure within the set of data structures. In embodiments, the set of output columns may include resultant values produced by a JOIN operation performed using the set of input columns (e.g., each value included in the set of output columns may represent the result of a JOIN operation performed on a corresponding value of the set of input columns). For example, the set of output columns may include the results of previous JOIN operations performed using the set of input columns. In certain embodiments, the query may include a SELECT statement. The SELECT statement may include a clause configured to choose, specify, or designate particular data within the database. In embodiments, the set of output columns may be identified from the SELECT statement of the query at block 352. For instance, as described herein, the query may be analyzed using a query parsing tool, and the columns that are specifically referenced (e.g., called out, specified, designated) in the SELECT statement of the query may be identified as the set of output columns (e.g., the SELECT statement indicates the set of output columns included in a set of data structures). Other methods of identifying the set of output columns are also possible.

Consider the following example. An SQL query including the following syntax may be received by a database:

SELECT A.C4+C.C2, B.C3||'ABC', UPPER (C.C4)
FROM TAB_1 AS A
TAB_2 AS B
TAB_3 AS C
WHERE A.C1=B.C1
AND B.C1=C.C1
AND A.C3>0

In embodiments, a query parsing tool may analyze the received query, and ascertain the WHERE clause as the predicate. In embodiments, as described herein, the lead data structure may be identified as the leading table column referenced in the predicate. For instance, with reference to the query shown herein, the input columns (e.g., for a join operation) may be identified as A.C1 and A.C3. In embodiments, the query parsing tool may analyze the received query and ascertain the SELECT statement. As described herein, the non-leading table columns in the SELECT statement may be identified as the output columns (e.g., for the join operation). For instance, with reference to the query shown herein, the output columns may be identified as B.C3, C.C2, and C.C4. Other methods of identifying the set of input columns and the set of output columns are also possible.

At block 360, a hash data structure may be constructed using the set of input columns and the set of output columns. Generally, constructing can include creating, formulating, composing, instantiating, or otherwise establishing the hash data structure. The hash data structure may include an array configured to map keys (e.g., hash keys) to values (e.g., hash values). In embodiments, the hash data structure may be used to store data from the set of input columns and the set of output columns to facilitate processing database requests (e.g., allowing for quick and efficient returns for data fetches and other database operations). As described herein, the hash data structure may be constructed using the set of input columns and the set of output columns. For instance, a hash key group that is derived from a set of values of the set of input columns and a hash value group that is derived from a set of values of the set of output columns may be established to construct the hash data structure at block 362. Generally, establishing can include extracting, labeling, recognizing, ascertaining, or otherwise utilizing the set of values of the set of input columns as the hash key group and the set of values from the set of output columns as the hash value group. In embodiments, constructing may include using a hash function to map each hash key of the hash key group (e.g., a data entry from the set of input columns) to a corresponding hash value of the hash value group (e.g., a data entry from the set of output columns), and organizing the resultant key-value map in an associative array. In this way, a query requesting a particular data set (e.g., the output of a join operation performed on a given lead data structure/input table) may be searched using a hash key, and the corresponding hash value may be returned to resolve the query. Other methods of constructing the hash data structure using the set of input columns and the set of output columns are also possible.

At block 370, a cache may be built based on the hash data structure. Generally, building may include structuring, assembling, allocating, partitioning, formatting, organizing, or otherwise arranging the cache. The cache may include a portion of high-availability (e.g., continuously accessible to a processor or database manager) memory configured to store data used by the DBMS. In embodiments, the cache may include a hash table (e.g., a hash data structure constructed using a set of input columns and a set of output columns from a query). For example, the cache may include a join result cache configured to store the hash data structure such that queries requesting particular data sets (e.g., the output of join operations for a particular input column) may be resolved using the data in the join result cache (e.g., rather than searching through the entire database for the results). In embodiments, building the cache may be based on the hash data structure. For instance, as an example, building the cache may include calculating the expected/actual size of the hash data structure (e.g., 4 MB, 200 columns by 400 rows), and allocating a portion of cache memory space to accommodate storage of the hash data structure based on the calculated size. In embodiments, building the cache may include joining the hash key group and the hash value group at block 372. Generally, joining can include linking, correlating, associating, relating, or otherwise mapping the hash key group with the hash value group. For instance, joining may include correlating each data entry of the set of input columns (e.g., the hash key group) with a data entry of the set of output columns (e.g., the hash value group), and saving the resulting hash map to the cache. Other methods of building the cache based on the hash data structure are also possible.

In embodiments, the query may be processed by the DBMS using the cache at block 374. Generally, processing can include resolving, carrying-out, executing, or otherwise performing the query by the DBMS using the cache. In embodiments, processing the cache may include fetching a result (e.g., output of a join operation for a given set of input columns) from the hash data structure stored in the cache and delivering it to the source of the query (e.g., user, administrator, computing process). In embodiments, processing the query may include generating a valid results-set and providing it to a user. For instance providing the valid results-set can include using a query plan to route the valid results-set to an originator of the query, process an output with respect to the valid results-set, return the valid results-set to storage (e.g., adding a new data entry to the hash data structure in the cache) or display at least a portion of valid results set to a user. As an example, processing a query including a join operation may include identifying a set of input columns specified by the query, and searching the hash data structure within the cache for a hash key (e.g., input) that matches the specified input column. In response to identifying the hash key that matches the specified input column, a hash value (e.g., output) that corresponds to the hash key may be fetched and provided to a user (e.g., to present the result of the join operation using the specified set of input columns). Other methods of processing the query by the DBMS using the cache are also possible.

Method 300 concludes at block 399. As described herein, aspects of method 300 relate to using a set of input columns and a set of output columns to build a cache to facilitate query processing management of a query. Aspects of method 300 may provide performance or efficiency benefits for query processing management in a database management system. As an example, queries that request results for operations that have been performed in the past (e.g., redundant join operations specified by subqueries) may be processed using a hash data structure stored in the cache to facilitate query managing efficiency (e.g., the results of past operations may be identified and provided as the result of the query rather than performing the join operation additional times). Altogether, leveraging a dynamic join result cache may be associated with streamlined query management, processing efficiency, and database performance.

Figure 4:
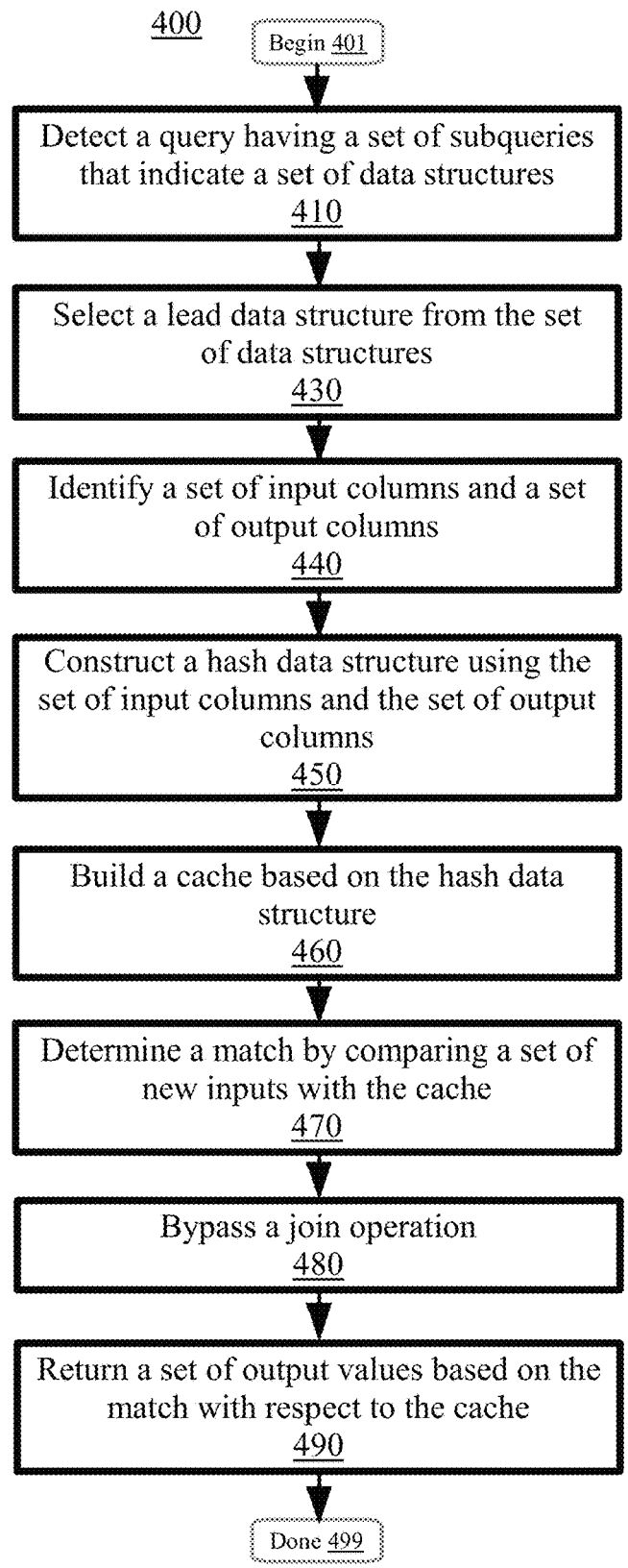
FIG. 4 is a flowchart illustrating a method for query processing management in a database management system (DBMS), according to embodiments.

FIG. 4 is a flowchart illustrating a method 400 for query processing management in a database management system (DBMS), according to embodiments. Aspects of method 400 relate to using a cache having a hash data structure to facilitate query processing. In embodiments, aspects of FIG. 4 may substantially correspond to other embodiments described herein and illustrated in FIGS. 1-9. At block 410, a query that has a set of subqueries indicating a set of data structures may be detected. At block 430, a lead data structure may be selected from the set of data structures. At block 440, a set of input columns may be identified from the lead data structure and a set of output columns may be identified from the set of data structures other than the lead data structure. At block 450, a hash data structure may be constructed using the set of input columns and the set of output columns. At block 460, a cache may be built based on the data cache structure. The method 400 may begin at block 401.

In embodiments, a match may be determined by comparing a set of new inputs with the cache at block 470. Generally, determining can include resolving, computing, formulating, analyzing, identifying, evaluating, or otherwise ascertaining the match. As described herein, aspects of the disclosure relate to the recognition that, in some situations, a database query may request a result for an operation that has been performed in the past (e.g., a join operation using particular input columns). Accordingly, aspects of the disclosure relate to determining that a new query (e.g., specifying a set of inputs) matches (e.g., corresponds with, agrees with) the input of a previously performed operation, and providing a stored result for the query from a cache. In embodiments, determining may include comparing (e.g., examining, assessing, evaluating) a set of new inputs (e.g., input columns specified in a query received by the database) with a set of inputs stored in the cache, and determining that the set of new inputs achieves a similarity threshold with respect to the stored inputs. As an example, a set of new inputs specifying input columns of A.C1 and A.C3 may be compared to the input columns stored in the cache (e.g., input columns for which operations have been performed in the past), and it may be ascertained that the new input columns substantially correspond with input columns stored in the cache of A.C1 and A.C3. In embodiments, determining may include comparing the data values stored in the new input columns with those input columns stored in the cache to determine agreement/correspondence. Other methods of determining the match by comparing the set of new inputs with the cache are also possible.

In embodiments, a join operation may be bypassed at block 480. As described herein, aspects of the disclosure relate to providing a result set (e.g., set of output columns) for a query based on stored results in a cache. In this way, queries may be resolved using data from the cache without the need to execute database processing operations (e.g., join operations). Generally, bypassing can include skipping, avoiding, circumventing, ignoring, removing, or otherwise omitting the join operation. In embodiments, bypassing the join operation may include performing the database operations of a query prior to the join operation, resolving a join operation using the stored results in the hash data structure of the cache (e.g., without performance of the join operation itself), and proceeding to manage subsequent database operations specified by the query. Bypassing performance of a join operation may be associated with query management efficiency, reduced computing resources, and database performance. Other methods of bypassing the join operation are also possible.

In embodiments, a set of output values may be returned based on the match with respect to the cache at block 490. As described herein, aspects of the disclosure relate to using stored results in a cache (e.g., having a hash data structure) to manage a query (e.g., rather than performing the calculations, searches, and other tasks associated with executing one or more operations of the query). Generally, returning can include fetching, displaying, presenting, conveying, relaying, or otherwise providing the set of output values. The set of output values may include the results that correspond to a set of inputs specified by a query. In embodiments, returning may include delivering the set of output values that correspond to the set of new inputs that were compared and matched with inputs recorded in the cache. As an example, in response to determining that a set of input columns of A.C1 and A.C3 specified in a query match input columns stored in the cache, a join operation may be bypassed, and a set of output columns including B.C3, C.C2, and C.C4 (e.g., output columns corresponding to the specified input columns) may be provided (e.g., to a user, processing operation). Other methods of returning the set of output values are also possible. The method 400 may end at block 499.

Figure 5:
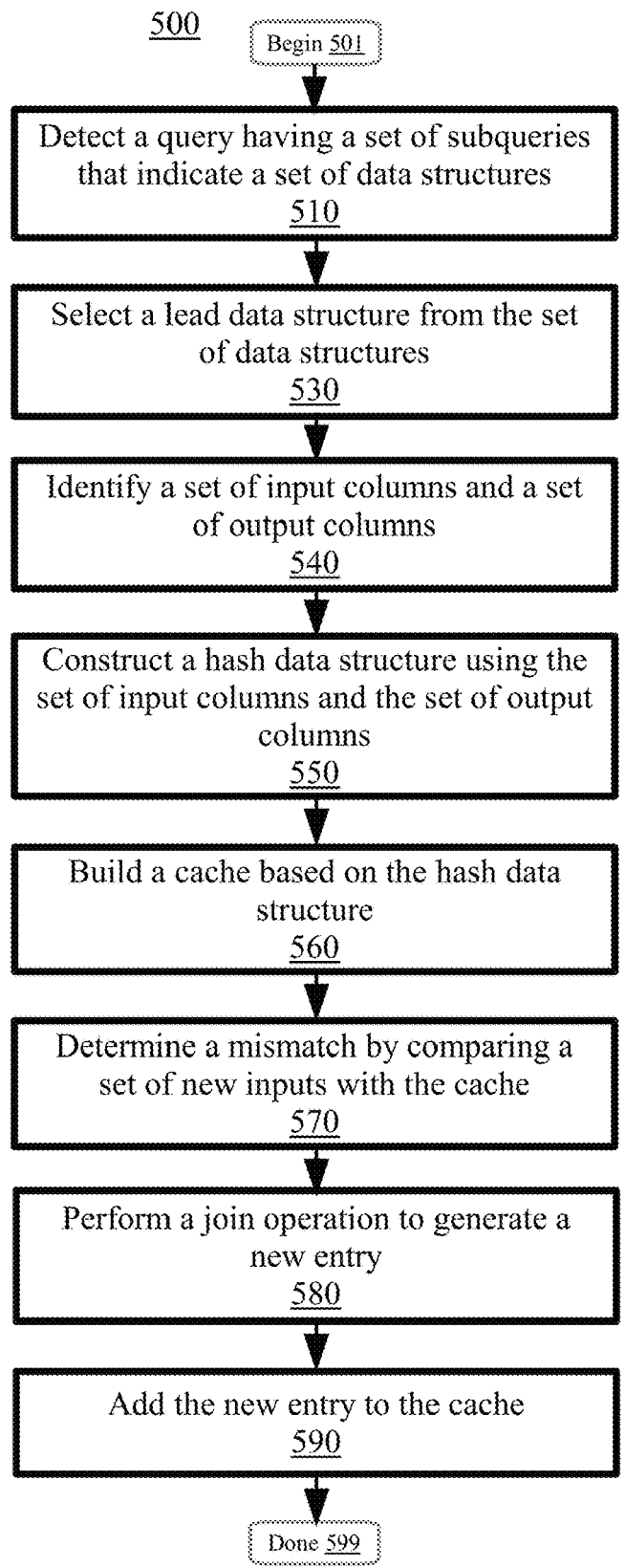
FIG. 5 is a flowchart illustrating a method for query processing management in a database management system (DBMS), according to embodiments.

FIG. 5 is a flowchart illustrating a method 500 for query processing management in a database management system (DBMS), according to embodiments. Aspects of method 500 relate to updating a cache having a hash data structure to facilitate query processing. In embodiments, aspects of FIG. 5 may substantially correspond to other embodiments described herein and illustrated in FIGS. 1-9. At block 510, a query that has a set of subqueries indicating a set of data structures may be detected. At block 530, a lead data structure may be selected from the set of data structures. At block 540, a set of input columns may be identified from the lead data structure and a set of output columns may be identified from the set of data structures other than the lead data structure. At block 550, a hash data structure may be constructed using the set of input columns and the set of output columns. At block 560, a cache may be built based on the data cache structure. The method 500 may begin at block 501.

In embodiments, a mismatch may be determined by comparing a set of new inputs with the cache at block 570. Generally, determining can include resolving, computing, formulating, analyzing, identifying, evaluating, or otherwise ascertaining the mismatch (e.g., discrepancy, divergence, disparity, dissimilarity). As described herein, aspects of the disclosure relate to the recognition that, in some situations, the cache may not include the results of an operation specified by a query (e.g., the operation has not been performed before). Accordingly, aspects of the disclosure relate to determining that the results of the operation are not in the cache, and updating the cache to store the result (e.g., output) of an operation (e.g., for managing subsequent queries). In embodiments, determining may include comparing (e.g., examining, assessing, evaluating) a set of new inputs specified by a query with a set of inputs stored in the cache, and determining that the set of new inputs fails to achieve a similarity threshold with respect to one or more entries of the cache (e.g., the cache does not include the inputs). For instance, a set of new inputs specifying input columns of T.M1 and T.M2 may be compared to the input columns stored in the cache, and it may be ascertained that no stored inputs in the cache correspond to the set of new inputs. Other methods of determining the mismatch by comparing the set of new inputs with the cache are also possible.

In embodiments, a join operation may be performed to generate a new entry at block 580. Generally, performing may include implementing, carrying-out, initiating, instantiating, or otherwise executing the join operation. In embodiments, performing the join operation may include enacting one or more operational steps to combine columns or rows from one or more tables (e.g., data structures) in a database. In embodiments, performing the join operation may include combining the columns specified by the set of new inputs of a query to create a set of output columns. The join operation may be performed according to parameters specified in a query or subquery such as JOIN, INNER, LEFT OUTER, RIGHT OUTER, FULL OUTER, CROSS, or the like. In embodiments, performing the join operation may generate a new entry including a set of output columns having a set of output values (e.g., the resulting output of performing the join operation on the specified input columns). Other methods of performing the join operation to generate a new entry are also possible.

In embodiments, the new entry may be added to the cache at block 590. Generally, adding may include adjoining, attaching, affixing, expanding, appending, or otherwise revising the cache with the new entry. As described herein, aspects of the disclosure relate to updating the cache to add a new entry corresponding to a particular database operation. The new entry may include a record of the input columns specified as targets of an operation, the name/type of the specific operation that was performed (e.g., LEFT OUTER JOIN), the output columns generated as a result of the operation on the input columns, and other information (e.g., time/date when the operation was performed, processing resources used by the operation). The cache may be adjusted, revised, expanded, or otherwise modified to accommodate storage of the new entry in the cache (e.g., within the hash data structure). As an example, a new set of rows and columns may be generated within the cache to store the new entry. Accordingly, in embodiments, subsequent queries that specify performance of an operation on the set of input columns (e.g., the same type of operation on the same set of inputs) may be resolved using the stored output data stored in the cache, bypassing a join operation. Other methods of adding the new entry to the cache are also possible. The method 500 may end at block 599.

Figure 6:
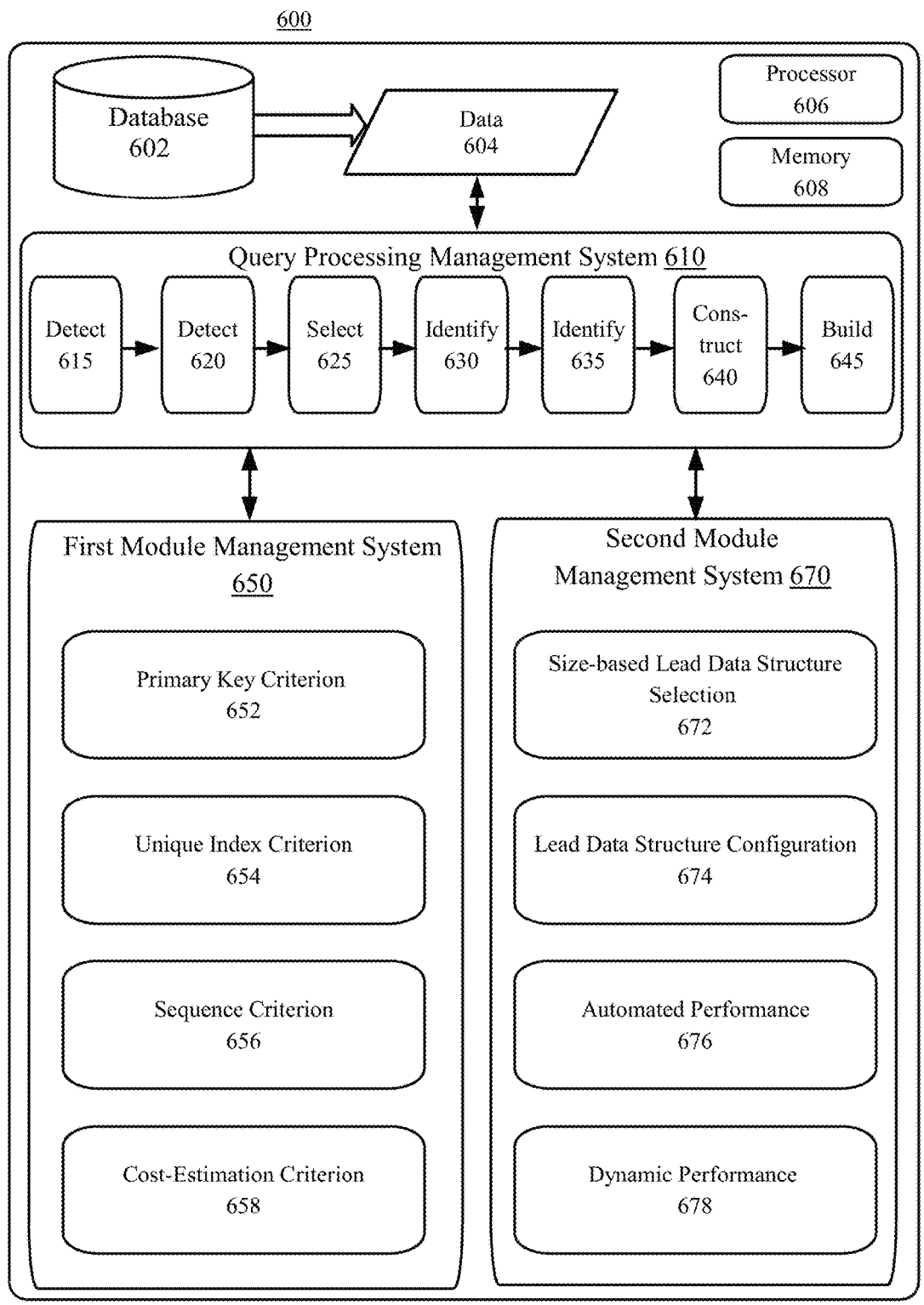
FIG. 6 depicts an example system for query processing management in a database management system (DBMS), according to embodiments.

FIG. 6 depicts an example system 600 for query processing management in a database management system (DBMS), according to embodiments. Aspects of FIG. 6 relate to managing a lead data structure for construction of a hash data structure. The example system 600 may include a processor 606 and a memory 608 to facilitate implementation of historical query processing management. The example system 600 may include a database 602 (e.g., SQL based relational database) configured to maintain and organize data and records in a set of formally described tables from which data can be accessed or reassembled. In embodiments, the example system 600 may include a query processing management system 610. The query processing management system 610 may be communicatively connected to the database 602, and be configured to receive data 604 (e.g., queries, requests, instructions for database operations) related to query processing management. The query processing management system 610 may include a first detecting module 615 for detecting that a query has a set of subqueries, a second detecting module 620 for detecting that the set of subqueries indicates a set of data structures, a selecting module 625 for selecting a lead data structure from the set of data structures using a selection criterion, a first identifying module 630 to identify a set of input columns from the lead data structure, a second identifying module 635 to identify a set of output columns from the set of data structures other than the lead data structure, a constructing module 640 to construct a hash data structure using the set of input columns and the set of output columns, and a building module 645 to build a cache based on the hash data structure. The query processing management system 610 may be communicatively connected with a first module management system 650 and a second module management 670 which each include a set of modules for implementing aspects of query processing management.

In embodiments, the selection criterion may be configured based on a primary key criterion at module 652. Generally, configuring may include setting-up, programming, adjusting, instructing, revising, or otherwise modifying the selection criterion based on the primary key criterion. The primary key criterion may include a unique identifier (e.g., key) in a relational database that is distinct for each record/entry in the database. In embodiments, a relational database may include a single primary key (e.g., one and only one). For instance, the primary key may be expressed as a column of data containing an identifier for one or more records of the database. As an example, for a database including records of the households in a town, a primary key of "phone number" may be selected to identify each household (e.g., each household may have a unique phone number). As another example, a primary key of "drivers license number" may be selected to serve as an identifier for residents of a town in a database. As described herein, the lead data structure may be selected using a selection criterion based on the primary key criterion. For instance, a particular input column may be excluded from selection as the lead data structure because one or more database objects of the particular input column are associated with a primary key (e.g., and therefore may not be duplicated as part of a cache or hash data structure). Other methods of using the primary key criterion to facilitate selection of the lead data structure are also possible.

In embodiments, the selection criterion may be configured based on a unique index criterion at module 654. Generally, configuring may include setting-up, programming, adjusting, instructing, revising, or otherwise modifying the selection criterion based on the unique index criterion. The unique index criterion may include an index that enforces the constraint that each combination of values in the index is unique (e.g., two equal values may not exist in the same column in two different rows). As an example, a column that includes the coordinates (1,2), (2,3), (3,1) and (4, 4) may be considered to achieve a unique index, as the same value does not appear in the same position in different rows, while a column that includes the coordinates (1,2), (2,3), 3,1, and (1,4) may be detected to violate a unique index, as the value "1" appears in the first position of both the first and last entries (e.g., (1,2) and (1,4)). As described herein, the lead data structure may be selected using a selection criterion based on the unique index criterion. For instance, a particular column that achieves a unique index criterion may be excluded from selection as the lead data structure (e.g., columns associated with unique index criterion may not be duplicated as part of a cache or hash data structure). Other methods of using the unique index criterion to facilitate selection of the lead data structure are also possible.

In embodiments, the selection criterion may be configured based on a sequence criterion at module 656. Generally, configuring may include setting-up, programming, adjusting, instructing, revising, or otherwise modifying the selection criterion based on the sequence criterion. The sequence criterion may include a user-defined scheme bound object that generates a sequence of numeric values according to a designated specification with which the sequence was created. The sequence of numeric values may be generated in an ascending or descending order at a defined interval, and be configured to restart (cycle) upon completion. As examples, sequences that increase by specified values (e.g., sequence that increases by 1), decrease by specified values (e.g., sequence that decreased by 3), start with a specified value (e.g., sequence that starts with a designated number of 2155), have a specific data type (e.g., sequence of positive integers between 9 and 949), or include particular arguments/clauses (e.g., sequence including an "INCREMENT" operation) may be created. As described herein, the lead data structure may be selected using a selection criterion based on the sequence criterion. For instance, a column that includes a specified sequence (e.g., increase by 1) may be selected as the lead data structure (e.g., for ease of searching, data retrieval). In certain embodiments, a column that includes a specified sequence (e.g., or does not include a specified sequence) may be excluded from selection as the lead data structure (e.g., formatting may complicate comparison or data storage). Other methods of using the sequence criterion to facilitate selection of the lead data structure are also possible.

In embodiments, the selection criterion may be configured based on a cost estimation criterion at module 658. Generally, configuring may include setting-up, programming, adjusting, instructing, revising, or otherwise modifying the selection criterion based on the cost estimation criterion. The cost estimation criterion may include an attribute, property, characteristic, or other factor that indicates the expected cost of generating a hash data structure or cache using a particular data structure as the lead data structure. The cost estimation criterion may express the expected cost in terms of currency (e.g., financial cost), database size (e.g., the number of rows/columns that would be created), computing resources (e.g., memory, storage space, processing resources), personnel resources (e.g., number of employees, man-hours), time (e.g., to process a query) or other format. As examples, the cost estimation criterion may indicate an expected cost of 15 megabytes of storage, 800 columns by 1200 rows, 40 seconds to process a query, or the like. As described herein, the lead data structure may be selected using a selection criterion based on the cost estimation criterion. For instance, a cost estimation simulation may be performed to calculate the estimated cost (e.g., in terms of financial cost, database size, computing resources, personnel resources, time) of generating a hash data structure using a particular data structure as the lead data structure for several candidate data structures, and a data structure that achieves a cost threshold value (e.g., cost below a particular value) may be selected as the lead data structure. Other methods of using the cost-estimation criterion to facilitate selection of the lead data structure are also possible.

In embodiments, aspects of the disclosure relate to selecting a candidate lead data structure as the lead data structure based on a projected size of a cache built using the candidate lead data structure at module 672. In embodiments, a first estimated size of a cache may be calculated with respect to using a first candidate lead data structure of the set of data structures, and a second estimated size of a cache may be calculated with respect to using a second candidate lead data structure of the set of data structures. Generally, calculating can include computing, formulating, estimating, deriving, or otherwise ascertaining the first estimated size of the cache with respect to using the first candidate lead data structure and the second estimated size of the cache with respect to using the second candidate lead data structure. The first and second candidate lead data structures may include data structures of the set of data structures that may potentially be selected for use as the lead data structure. In embodiments, the first and second estimated cache sizes may include approximate values of the size (e.g., in terms of rows and columns, cells, data objects) of a cache that would be generated using the first or second candidate lead data structures, respectively. In embodiments, calculating may include utilizing a simulation to project or predict the size of the hash data structure/cache that would be generated using a particular candidate lead data structure. For example, a simulation may be performed using the first candidate lead data structure, and a first estimated size of the cache may be computed to be 283 columns by 834 rows. As another example, a simulation may be performed using the second candidate lead data structure, and a second estimated size of the cache may be computed to be 50 columns by 100 rows. Other ways of calculating the estimated size of the caches using the first and second candidate data structures are also possible.

In embodiments, the first and second estimated sizes of the cache may be compared. Generally, comparing can include contrasting, assessing, correlating, analyzing, investigating, or otherwise examining the first and second estimated sizes of the cache with respect to one another. In embodiments, comparing may include ascertaining the relative magnitude of the first estimated size of the cache with respect to the second estimated size of the cache. In embodiments, the first estimated size of the cache and the second estimated size of the cache may be compared in terms of the total number of data cells. For instance, for a first estimated cache size of 200 rows by 300 rows and a second estimated cache size of 150 rows by 600 rows, a first data cell count of 60,000 (e.g., total number of cells for the first estimated cache size) may be compared with a second data cell count of 90,000 (e.g., total number of cells for the second estimated cache size). In response to comparing the first and second estimated cache sizes, it may be determined (e.g., identified, formulated, derived, ascertained) that the second estimated cache size exceeds the first estimated cache size (e.g., 90,000 cells is greater than 60,000 cells). Based on the comparison, the first candidate lead data structure may be selected (e.g., chosen, elected, identified) as the lead data structure (e.g., smaller cache sizes may be associated with efficient query processing). Other methods of selecting the lead data structure are also possible.

In embodiments, the lead data structure may be configured to include a plurality of data structures of the set of data structures at module 674. The lead data structure may be configured based on the cost estimation criterion. Generally, configuring may include structuring, revising, organizing, constructing, or otherwise arranging the lead data structure to include a plurality of data structures. Aspects of the disclosure relate to the recognition that, in some situations, using a single data structure (e.g., table) as the lead data structure may result in large hash data structures/caches (e.g., negatively impacting the efficiency of query processing). According, in embodiments, aspects of the disclosure relate to configuring the lead data structure to include multiple data structures in order to decrease the size of the cache (e.g., and positively impact query processing efficiency). In embodiments, configuring may include formatting multiple data structures (e.g., input columns) with a hash key that corresponds to a hash value (e.g., for fetching output columns from the cache). Consider the following example. An estimated cache size of 50,000 rows may be calculated for a situation in which an input column T1 is used as a lead data structure. Additional estimated cache sizes may be calculated for other situations, and it may be determined that if the three input columns T1, T2, and T3 are used as a first lead table, and the three input columns T4, T5, and T6 are used as a second lead table, two caches with estimated cache sizes of 100 rows and 500 rows, respectively, may be constructed. Accordingly, as described herein, the lead data structure may be configured to include multiple data structures (e.g., T1, T4) in order to decrease the size of the cache. Other methods of configuring the lead data structure to positively impact query processing performance are also possible.

In embodiments, the detecting that the query has a set of subqueries, the detecting that the set of subqueries indicates a set of data structures, the selecting of the lead data structure, the identifying of the set of input columns, the identifying of the set of output columns, the constructing of the hash data structure, the building of the cache, and other steps described herein may each occur in an automated fashion without user intervention at module 676. In embodiments, the detecting that the query has a set of subqueries, the detecting that the set of subqueries indicates a set of data structures, the selecting of the lead data structure, the identifying of the set of input columns, the identifying of the set of output columns, the constructing of the hash data structure, the building of the cache, and other steps described herein may be carried out by an internal query processing management module maintained in a persistent storage device of a local computing device (e.g., computer or server connected to a local network). In certain embodiments, the detecting that the query has a set of subqueries, the detecting that the set of subqueries indicates a set of data structures, the selecting of the lead data structure, the identifying of the set of input columns, the identifying of the set of output columns, the constructing of the hash data structure, the building of the cache, and other steps described herein may be carried out by an external query processing management module hosted by a remote computing device or server (e.g., server accessible via a subscription, usage-based, or other service model). In this way, aspects of query processing management may be performed using automated computing machinery without manual action. Other methods of performing the steps described herein are also possible.

In embodiments, the detecting that the query has a set of subqueries, the detecting that the set of subqueries indicates a set of data structures, the selecting of the lead data structure, the identifying of the set of input columns, the identifying of the set of output columns, the constructing of the hash data structure, the building of the cache, and other steps described herein may each occur in a dynamic fashion to streamline debugging at module 678. For instance, the detecting that the query has a set of subqueries, the detecting that the set of subqueries indicates a set of data structures, the selecting of the lead data structure, the identifying of the set of input columns, the identifying of the set of output columns, the constructing of the hash data structure, the building of the cache, and other steps described herein may occur in real-time, ongoing, or on-the-fly. As an example, one or more steps described herein may be performed simultaneously (e.g., the set of input columns and the set of output columns may be identified at substantially the same time/simultaneously) in order to streamline (e.g., facilitate, promote, enhance) query processing management.

FIG. 7 depicts an example set of data structures 700 for query processing management in a database system (DBMS), according to embodiments. Aspects of FIG. 7 relate to a set of data structures (e.g., tables) for generation of a hash data structure for facilitating query processing. In embodiments, the set of data structures 700 may include Table A 710, a Table B 720, and a Table C 730. As shown in FIG. 7, each table may include a set of rows and columns for storing data values. As described herein, aspects of the disclosure relate to selecting a lead data structure from among the set of data structures 700 for use in constructing the hash data structure. In embodiments, the lead data structure may be selected from the predicate of a database query (e.g., request for a join operation). For instance, consider the following SQL database request with respect to the set of data structures 700:

SELECT A.C4+C.C2, B.C3||'ABC', UPPER (C.C4)
FROM TABLE A AS A
   TABLE B AS B
   TABLE C AS C
WHERE A.C1=B.C1
   AND B.C1=C.C1
   AND A.C3>0.

In embodiments, the query may be analyzed by a query parsing tool, and the WHERE clause may be ascertained as the predicate of the query. In embodiments, the lead data structure may be identified as the leading table column referenced in the predicate. Accordingly, columns A.C1 712 and A.C3 714 may be identified as the lead data structure (e.g., input columns) for construction of a hash data structure. Additionally, as described herein, the SELECT statement may be analyzed to determine non-leading table columns (e.g., output columns) for the hash data structure. Accordingly, the columns B.C3 716, C.C2 718, and C.C4 719 may be identified from the SELECT statement as the non-leading table columns (e.g., output columns) of the hash data structure. In embodiments, aspects of the disclosure relate to using a set of constraints 740 to define the columns for selection and construction of the hash data structure.

FIG. 8 depicts an example hash data structure 800 for query processing management in a database system (DBMS), according to embodiments. Aspects of FIG. 8 relate to using a set of input columns and a set of output columns to construct a hash data structure 800 to facilitate query processing. In embodiments, as described herein, a set of input columns 810 (e.g., lead data structure) and a set of output columns 820 (e.g., non-leading data structure) may be used to construct a hash data structure 800. In embodiments, constructing the hash data structure 800 may include using a hash function to map a set of hash keys of a hash key group (e.g., one or more data entries from the set of input columns 810) to a corresponding hash value of a hash value group (e.g., data entry from the set of output columns 820), and organizing the resultant key-value map as an associative array. In this way, a query requesting a particular data set (e.g., the output of a join operation performed on a given lead data structure/input table) may be searched using a hash key, and the corresponding hash value may be returned to resolve the query. For instance, in embodiments, the outer SELECT statement 830 may illustrate a set of results provided in response to a query processed using the hash data structure 800. Other methods of constructing and using the hash data structure 800 are also possible.

Figure 9:
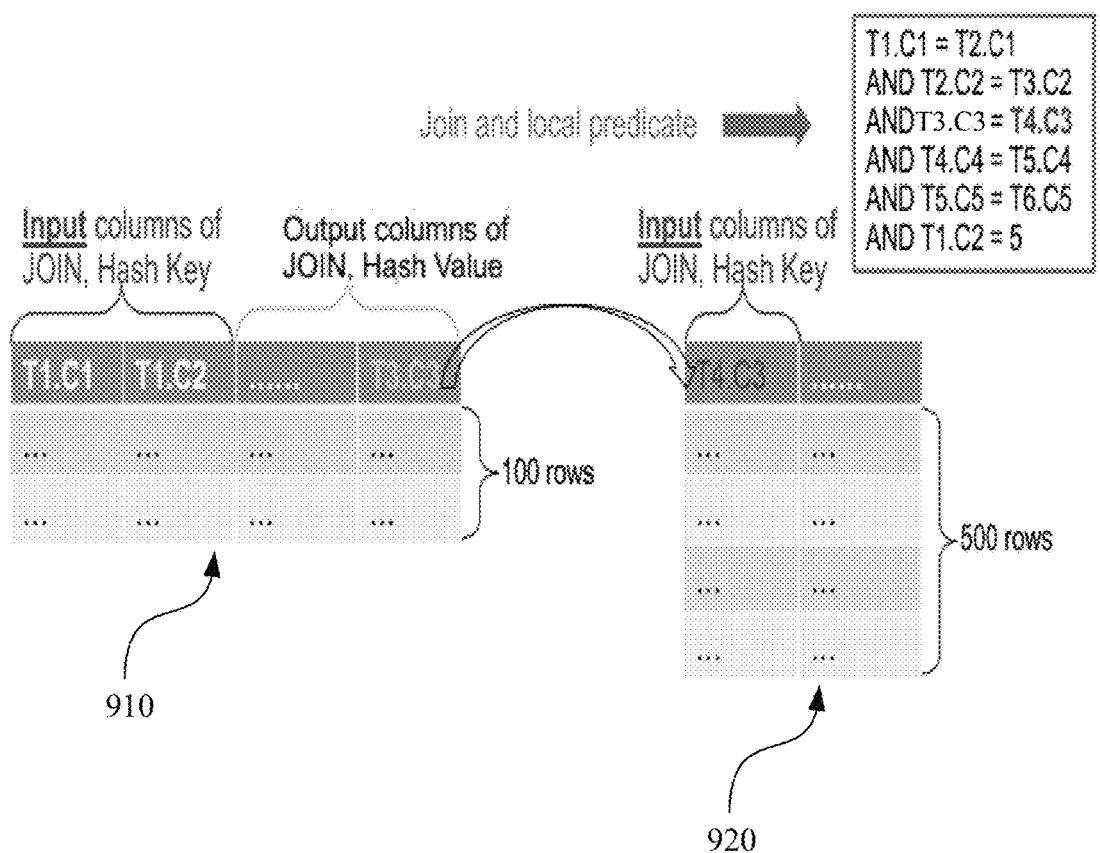
FIG. 9 depicts an example set of data structures for query processing management in a database system (DBMS), according to embodiments.

FIG. 9 depicts an example set of data structures 900 for query processing management in a database system (DBMS), according to embodiments. Aspects of FIG. 9 relate to a lead data structure configured to include a plurality of data structures. For instance, the set of data structures 900 may include a first set of input columns 910 and a second set of input columns 920. Aspects of the disclosure relate to the recognition that, in some situations, using a single data structure (e.g., table) as the lead data structure may result in large hash data structures/caches (e.g., negatively impacting the efficiency of query processing). According, in embodiments, aspects of the disclosure relate to configuring the lead data structure to include multiple data structures in order to decrease the size of the cache (e.g., and positively impact query processing efficiency). As an example, it may be calculated that if an input column of T1 is used (e.g., alone) as the input column for a hash data structure, that the size of the cache may exceed 50,000 rows. Additional estimated cache sizes may be calculated for other situations, and it may be determined that if the three input columns T1, T2, and T3 are used as a first lead data structure, and the three input columns T4, T5, and T6 are used as a second lead data structure, two caches with estimated cache sizes of 100 rows and 500 rows, respectively, may be constructed. Accordingly, as described herein, a first set of input columns 910 including the columns T1, T2, and T3, as well as a set of input columns 920 including the columns T4, T5, and T6 may be used as lead data structures to facilitate construction of a hash data structure. Other methods of configuring the lead data structure to positively impact query processing performance are also possible.

In addition to embodiments described above, other embodiments having fewer operational steps, more operational steps, or different operational steps are contemplated. Also, some embodiments may perform some or all of the above operational steps in a different order. The modules are listed and described illustratively according to an embodiment and are not meant to indicate necessity of a particular module or exclusivity of other potential modules (or functions/purposes as applied to a specific module).

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

Embodiments of the present disclosure may also be delivered as part of a service engagement with a client corporation, nonprofit organization, government entity, internal organizational structure, or the like. These embodiments may include configuring a computer system to perform, and deploying software, hardware, and web services that implement, some or all of the methods described herein. These embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to exemplary embodiments, other and further embodiments of the invention may be devised without departing from the basic scope thereof, and the scope thereof is determined by the claims that follow. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. "Set of," "group of," "bunch of," etc. are intended to include one or more. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of exemplary embodiments of the various embodiments, reference was made to the accompanying drawings (where like numbers represent like elements), which form a part hereof, and in which is shown by way of illustration specific exemplary embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

What is claimed is:

1. A computer-implemented method for query processing management in a database management system (DBMS), the method comprising:
    detecting, by the DBMS, that a query has a set of subqueries;
    detecting, by the DBMS, that the set of subqueries relate to a set of data structures;
    selecting, from the set of data structures, a lead data structure of the set of data structures using a selection criterion;

identifying, from the lead data structure of the set of data structures, a set of input columns;
identifying, from the set of data structures other than the lead data structure, a set of output columns;
constructing, using the set of input columns and the set of output columns, a hash data structure, wherein the hash data structure comprises a plurality of hash values correlated to a plurality of data input columns; and
performing a join operation with the lead data structure and a second data structure of the set of data structure comprising:
  searching the plurality of hash values for a single hash value matching a second hash value for a second data column of the second data structure; and
  based on not finding a match between the second hash value and the plurality of hash values, performing a join operation between the lead data structure and the second data structure and building a dynamic join result cache comprising a plurality of hash values that using input columns resulting from the join operation of the lead data structure and the second data structure.

2. The method of claim 1, wherein:
the set of data structures includes a set of tables;
a subquery of the set of subqueries includes a FROM clause;
the FROM clause indicates the set of tables;
the query has a set of predicates;
the set of predicates indicates the set of input columns;
the lead data structure includes the set of input columns;
the query has a SELECT statement;
the SELECT statement indicates the set of output columns;
the set of data structures includes the set of output columns; and
the set of output columns is external with respect to the lead data structure.

3. The method of claim 1, further comprising:
preserving the query to keep the query unchanged with respect to semantic features of the query.

4. The method of claim 1, further comprising:
sustaining a set of indexes of the set of data structures to maintain the set of indexes without creation of a new index to process the query.

5. The method of claim 1, further comprising:
configuring the selection criterion based on a primary key criterion.

6. The method of claim 1, further comprising:
configuring the selection criterion based on a unique index criterion.

7. The method of claim 1, further comprising:
configuring the selection criterion based on a sequence criterion.

8. The method of claim 1, further comprising:
configuring the selection criterion based on a cost estimation criterion.

9. The method of claim 8, further comprising:
calculating, with respect to using a first candidate lead data structure of the set of data structures, a first estimated size of a cache;
calculating, with respect to using a second candidate lead data structure of the set of data structures, a second estimated size of the cache;
comparing the first and second estimated sizes of the cache;
determining that the second estimated size of the cache exceeds the first estimated size of the cache; and selecting, as the lead data structure, the first candidate lead data structure.

10. The method of claim 8, further comprising:
configuring, based on the cost estimation criterion, the lead data structure to include a plurality of data structures of the set of data structures.

11. The method of claim 1, further comprising:
ordering, to manage cache efficiency, a set of records of the lead data structure.

12. The method of claim 1, further comprising:
identifying, from a set of predicates of the query, the set of input columns of the lead data structure; and
identifying, from a SELECT statement of the query, the set of output columns of the set of data structures.

13. The method of claim 1, further comprising:
establishing, to construct the hash data structure, a hash key group that is derived from a set of values of the set of input columns; and
establishing, to construct the hash data structure, a hash value group that is derived from a set of values of the set of output columns.

14. The method of claim 1, further comprising:
processing, by the DBMS using the cache, the query.

15. The method of claim 1, further comprising:
determining, by comparing a set of new inputs with the cache, a match;
bypassing a join operation; and
returning, based on the match with respect to the cache, a set of output values.

16. The method of claim 1, wherein the set of operational steps each occur in both:
a dynamic fashion to streamline query processing management, and
an automated fashion without user intervention.

17. A system for query processing management in a database management system (DBMS), the system comprising:
a memory having a set of computer readable computer instructions, and
a processor for executing the set of computer readable instructions, the set of computer readable instructions including:
  detecting, by the DBMS, that a query has a set of subqueries;
  detecting, by the DBMS, that the set of subqueries relate to a set of data structures;
  selecting, from the set of data structures, a lead data structure of the set of data structures using a selection criterion;
  identifying, from the lead data structure of the set of data structures, a set of input columns;
  identifying, from the set of data structures other than the lead data structure, a set of output columns;
  constructing, using the set of input columns and the set of output columns, a hash data structure, wherein the hash data structure comprises a plurality of hash values correlated to a plurality of data input columns; and
  performing a join operation with the lead data structure and a second data structure of the set of data structure comprising:
    searching the plurality of hash values for a single hash value matching a second hash value for a second data column of the second data structure; and
    based on not finding a match between the second hash value and the plurality of hash values, performing a join operation between the lead data structure and the second data structure and building a dynamic join result cache comprising a plurality of hash values that using input columns resulting from the join operation of the lead data structure and the second data structure.

18. A computer program product for query processing management in a database management system (DBMS), the computer program product comprising a computer readable storage medium having program instructions embodied therewith, wherein the computer readable storage medium is not a transitory signal per se, the program instructions executable by a processor to cause the processor to perform a method comprising:

detecting, by the DBMS, that a query has a set of subqueries;

detecting, by the DBMS, that the set of subqueries relate to a set of data structures;

selecting, from the set of data structures, a lead data structure of the set of data structures using a selection criterion;

identifying, from the lead data structure of the set of data structures, a set of input columns;

identifying, from the set of data structures other than the lead data structure, a set of output columns;

constructing, using the set of input columns and the set of output columns, a hash data structure, wherein the hash data structure comprises a plurality of hash values correlated to a plurality of data input columns; and performing a join operation with the lead data structure and a second data structure of the set of data structure comprising:

searching the plurality of hash values for a single hash value matching a second hash value for a second data column of the second data structure; and based on not finding a match between the second hash value and the plurality of hash values, performing a join operation between the lead data structure and the second data structure and building a dynamic join result cache comprising a plurality of hash values that using input columns resulting from the join operation of the lead data structure and the second data structure.

\* \* \* \* \*